United States Patent
Danner et al.

[11] Patent Number: 5,908,474
[45] Date of Patent: Jun. 1, 1999

[54] TEXTILE DYE-FIXING AGENTS

[75] Inventors: Bernard Danner, Riedisheim, France; Jürg Heller, Oberwil, Switzerland

[73] Assignee: Clariant Finance (BVI) Limited, Tortola, Virgin Islands (Br.)

[21] Appl. No.: 08/913,827

[22] PCT Filed: Mar. 15, 1996

[86] PCT No.: PCT/EP96/01133
  § 371 Date: Sep. 15, 1997
  § 102(e) Date: Sep. 15, 1997

[87] PCT Pub. No.: WO96/29463
  PCT Pub. Date: Sep. 26, 1996

[30] Foreign Application Priority Data

Mar. 18, 1995 [DE] Germany ............... 195 09 982

[51] Int. Cl.⁶ .................. D06P 1/52; D06P 5/08
[52] U.S. Cl. ............ 8/436; 8/554; 8/917; 8/918; 8/924; 8/442; 525/192; 525/193; 525/217
[58] Field of Search ............... 8/436, 554, 551, 8/529, 532, 917, 918, 924; 525/217, 192, 193, 442

[56] References Cited

U.S. PATENT DOCUMENTS

| | | |
|---|---|---|
| 2,595,935 | 5/1952 | Daniel, Jr. et al. . |
| 3,700,623 | 10/1972 | Keim . |
| 3,966,684 | 6/1976 | Espy et al. . |
| 4,129,528 | 12/1978 | Petrovich et al. . |
| 4,279,794 | 7/1981 | Dumas . |
| 4,295,931 | 10/1981 | Dumas . |
| 4,298,715 | 11/1981 | Van Eenam . |
| 4,604,217 | 8/1986 | Lukach et al. . |
| 4,822,374 | 4/1989 | Topfl et al. . |
| 4,838,896 | 6/1989 | Kissling et al. . |
| 4,853,437 | 8/1989 | Lukach et al. . |
| 4,864,007 | 9/1989 | Schleusener . |
| 5,147,411 | 9/1992 | Topfl . |

FOREIGN PATENT DOCUMENTS

| | | |
|---|---|---|
| 97974 | 1/1984 | European Pat. Off. . |
| 0 250 365 A1 | 12/1987 | European Pat. Off. . |
| 0 280 655 A2 | 8/1988 | European Pat. Off. . |
| 0 438 380 A1 | 7/1991 | European Pat. Off. . |
| 0 447 352 A1 | 9/1991 | European Pat. Off. . |
| 37 06 176 A1 | 2/1987 | Germany . |
| 37 20 508 A1 | 1/1988 | Germany . |
| 39 38 918 A1 | 5/1991 | Germany . |
| 59/066600 | 4/1984 | Japan . |
| 6-108382 | 4/1994 | Japan . |

*Primary Examiner*—Margaret Einsmann
*Attorney, Agent, or Firm*—Scott E. Hanf

[57] ABSTRACT

The present invention provides a dye-fixing agent, obtainable by reacting in a first reaction step, either a homopolymer of diallylamine or N-methyl-diallylamine or a copolymer of diallylamine and N-methyl-diallylamine, with an epihalohydrin, the reaction optionally taking place in the presence of an aliphatic amine or polyamine, or reacting the homopolymer or copolymer with a product obtainable by a reaction of epihalohydrin with an aliphatic amine or polyamine, optionally followed by partial quaternization of the reaction product of the first reaction step, characterized in that the end product possesses at least 10 mol % of tertiary amino groups of the following formula (I), based on the total number of amino groups

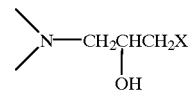

(I)

wherein X=halogen, with the provisos that when the homopolymer is an N-methyl-diallylamine, the presence of an aliphatic amine or a polyamine is obligatory in the reaction with the epihalohydrin and when the homopolymer is a homopolymer of diallylamine, partial quaternisation of the reaction product of the first reaction step is obligatory.

12 Claims, No Drawings

TEXTILE DYE-FIXING AGENTS

The present invention relates to textile after-treatment agents. The after-treatment agents are dye-fixing agents for improving the fastness properties of dyeings and prints, a process for the production thereof, and the use thereof.

Dyeings and prints often have unsatisfactory wet fastness, especially washing and water fastness. This is found with dyeings carried out using direct dyestuffs, acid dyestuffs and to a lesser extent reactive dyestuffs. Substantive dyestuffs are those which have an affinity with the fibre to which they are applied. All direct dyestuffs are regarded as being substantive to cellulosic materials in nature, whereas the reactive dyes are considered substantive as well as reactive. In the case of all reactive dyestuffs, part of the dyestuff will react chemically with a hydroxyl group on the cellulosic fibre and part of the dyestuff will not react with the fibre, but generally will be in a hydrolysed form. The part of the dyestuff which has not chemically reacted with the fibre may be removed by repeated washing. Acid dyes have a direct affinity towards protein fibres and are the main type of dyestuff used in wool dyeing. Direct dyestuffs are however the first choice for dyeing cellulosic materials, having a strong affinity for them. It is undesirable that dyestuffs exhibit a lack of wet-fastness since the thus removed dyestuff may be absorbed by undyed textile material being washed in the same washing operation and in addition the dyed substrate does not retain its original dyed colour. It is known to treat the textile after dyeing with a dye-fixing agent in order to improve the wet-fastness of the dye.

EP 0 250 365 (U.S. Pat. No. 4,822,374), discloses a dye-fixing process which particularly improves the wet fastness of cellulosic dyeings produced with substantive dyestuffs, whereby the fibre material is treated with a polyquaternary ammonium compound of a N-alkyl-diallylamine polymerisate.

In DE 3938918 there are described, inter alia, textile dye-fixing agents in the form of mixtures of copolymers of various allylamines with a condensate of epichlorohydrin and a polyalkylene polyamine and with a reaction product of ammonia or amine and an epichlorohydrin, whereby the individual components are not reacted together, but exist as a synergistic mixture.

Japanese Kokai No. 6-108382 discloses a process for improving the wet fastness of dyed cellulosic fibre materials using a polymer which is obtained by the reaction of diallylamine with epihalohydrin, with subsequent polymerisation of the reaction products. The disadvantage of this reaction product is that, during the reaction of diallylamine with epihalohydrin, a considerable part of diallylamine dimers bridged by 2-hydroxy-1,3-propylene may be produced, especially as a result in particular of the relatively high temperatures (20 to 60° C.) and the long reaction time (10 hours in example 1). This leads to a high degree of crosslinking when these compounds are polymerised. Such crosslinking has the effect that, during production or in storage, the aqueous end product becomes very viscous or even solid, and must therefore be precipitated in order to produce a storage-stable commercial product which is in powder form. A further disadvantage of the process described in Kokai No. 6-108382 is that there is a poor yield (82%–88%) of diallylamine polymer, or in other words, a relatively high monomer content. This is particularly undesirable, since diallylamine monomers are toxic.

It is the aim of the present invention to provide polymeric, crosslinkable, but water-soluble dye-fixing agents, which lead to improved fastness of dyeings, in particular cellulosic dyeings, said dye-fixing agents not having a significant proportion of diallylamine monomers.

This problem is solved by the dye-fixing agents according to the invention, which fix dyeings, in particular cellulosic dyeings on the fibre material particularly well, owing to the high reactivity with the textile fibres and the crosslinking to the fibre during application, and therefore produce especially good fastness of the dyeings. Furthermore high yields of the dye fixing-agents are obtained as a result of the production process of the invention, with the result that the fixing agents have a small proportion of diallylamine monomers. Thus as hereinafter described, the dye-fixing agents of the present invention impart excellent wet-fastness to the dyeings to which they are applied and furthermore the dye fixing-agents are storage stable and do not have a significant proportion of diallylamine monomers.

In this case, high yields lie between 95% and 100% or even between 98% and 100%. By a small proportion of diallylamine monomers is meant suitably less than about 5% by weight and preferably less than about 1.0% and more preferably less than 0.1% by weight.

The present invention accordingly provides a dye-fixing agent, obtainable by reacting in a first reaction step, either a homopolymer of diallylamine or N-methyl-diallylamine or a copolymer of diallylamine and N-methyl-diallylamine, with an epihalohydrin, the reaction optionally taking place in the presence of an aliphatic amine or polyamine, or reacting the homopolymer or copolymer with a product obtainable by a reaction of epihalohydrin with an aliphatic amine or polyamine, optionally followed by partial quaternisation of the reaction product of the first reaction step, characterised in that the end product possesses at least 10 mol % of tertiary amino groups of the following formula (I), based on the total number of amino groups

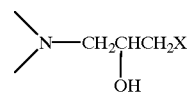

(I)

wherein X=halogen, with the provisos that when the homopolymer is an N-methyl-diallylamine, the presence of an aliphatic amine or a polyamine is obligatory in the reaction with the epihalohydrin and when the homopolymer is a homopolymer of diallylamine, partial quaternisation of the reaction product of the first reaction step is obligatory.

The diallylamine polymerisate should preferably not have any significant 2-hydroxy-1,3-propylene/diallylamine bridging, so that the dye-fixing agent according to the invention is water-soluble and at room temperature is stable in storage.

Such a dye-fixing agent has the advantage that, during application, the groups of formula (I) may crosslink on the fibres through a reaction of the 2-hydroxy-3-halopropyl radicals with polymeric, non-quaternary amino groups, and there is thus improved fixation on the fibres.

Preferred compounds are characterised in that the end product additionally possesses at least 10 mol %, preferably at least 20%, of tertiary amino groups of formula (II)

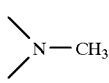
(II)

based on the polymerised diallylamino groups.

Further preferred compounds are characterised in that the end product possesses at least 15 to 80 mol %, preferably 20 to 70 mol %, most preferably 25 to 55 mol %, of tertiary amino groups of formula (I), based on the total number of amino groups.

The expression "tertiary amino groups" also includes protonated nitrogen molecules of formula (I) or (II), the protonated compounds being preferred. For protonation of the compounds according to the invention, the pH is generally acidified with strong inorganic or organic acids, especially glacial acetic acid, formic acid, phosphoric acid, sulphuric acid or hydrochloric acid.

Preferred compounds are compounds S, which are obtainable by means of a (partial) reaction of a homopolymer of diallylamine with an epihalohydrin, with subsequent quaternisation.

The quaternisation agents which may be employed are dimethyl sulphate, diethyl sulphate, methyl- or ethyl-halide, whereby dimethyl sulphate is preferably used.

During the production of compounds S, the molar ratio of diallylamine polymer to epihalohydrin is preferably 1 mol to 0.5 mols. The product of the reaction of diallylamine polymer with epihalohydrin is preferably quaternised with 1 mol of dimethyl sulphate.

The epihalohydrin is preferably epichlorohydrin, i.e. the substituent X in formula I is preferably Cl.

The homopolymer of diallylamine is preferably produced by protonating diallylamine using a mineral acid, preferably HCl, and thereafter polymerising in the presence of an initiator, preferably sodium persulphate or azobis-2(2'-amidinopropane)-dihydrochloride, and a regulator, preferably phosphorous acid. The subsequent reaction with epihalohydrin is preferably effected in a basic medium at pH 8–10, preferably pH 9.

Equally preferred compounds are compounds T, which are obtainable by reacting in a first reaction step a homopolymer of N-methyl-diallylamine or a copolymer of diallylamine and N-methyl-diallylamine with an epihalohydrin (b) in the presence of an aliphatic amine or polyamine, or preferably reacting the homopolymer or copolymer with the precondensate product (a) obtainable by reacting an epihalohydrin with a polyalkylene polyamine, optionally followed by partial quaternisation of the reaction product.

The epihalohydrin (b) may also be present in the form of a polyepihalohydrin.

In the production of T, the reaction with epihalohydrin (b) is effected either in a one-step process (1) or in two step process (2). Preferably in (2), the aliphatic amine, the polyamine or the precondensate is reacted with epihalohydrin (b) and thereafter the reaction product is reacted with the diallylamine copolymer or homopolymer. Alternatively, the diallylamine copolymer or homopolymer is first reacted with epichlorohydrin and subsequently with the aliphatic amine, the polyamine or the precondensate The reaction according to (1) above, is carried out in an alkaline range at −15° C. to +40° C., preferably −10° C. to +25° C., most preferably −5° C. to 10° C., or in a neutral to strongly acidic range at 40° C. to 90° C., preferably 50° C. to 80° C. The reaction according to (2) is preferably carried out in such a way that the amine or polyamine is reacted with the epihalohydrin in an alkaline range at −15° C. to +40° C., and the reaction product is subsequently brought to react, either directly or after adding an alkali to form epoxy rings, with the diallylamine polymerisate at low temperatures in an alkaline range.

The aliphatic amine used in producing T is preferably an aliphatic primary or secondary amine with one or more amino groups and a molecular weight of 17 to 1,000,000, preferably 50 to 500,000, most preferably 100 to 100,000. Similarly included are mixtures of such amines or polyamines. Examples of such amines are in particular ammonia, methyl- or ethylamine, dimethylamine, aminoguanidine, hydrazine, piperazine, aminoethyl piperazine, hydroxyethyl ethylenediamine, N-dimethylaminopropylamine, ethylenediamine, N-propylamino ethylenediamine, or a polyalkylene polyamine, e.g. dipropylene triamine, tetraethylene pentamine, diethylene triamine, triethylene tetramine, pentaethylene hexamine or a polyethylene or polypropylene imine with a molecular weight of 100 to 150,000, or reaction products of dicyandiamide with polyalkylene polyamines, reaction products of dicarboxylic acids with polyalkylene polyamines, reaction products of polyepihalohydrin with polyalkylene polyamines, polyvinyl amines or mixtures thereof, whereby tetraethylene pentamine is preferred in particular. The aliphatic amine preferably exists as a precondensate with epihalohydrin, most preferably as a precondensate of epihalohydrin with a polyalkylene polyamine, most preferably as a precondensate of epihalohydrin with tetraethylene pentamine.

In the production of compounds T, preferably N-methyl-diallylamine and diallylamine are copolymerised in a molar ratio of 9:1 to 2:8.

For the production of a precondensate of epihalohydrin and an aliphatic amine or polyamine, the molar ratios are selected such that a precondensate with a molecular weight of 500 to 100,000, preferably 750 to 50,000, most preferably 1000 to 20,000 is obtained. The precondensate may be produced both in an alkaline and acidic range, under aqueous conditions or water-free conditions.

In the case of compounds T, the ratio of diallylamino groups to the remaining amino groups is 1:0.5 to 4, preferably 1:0.75 to 3, most preferably 1:1 to 2. The amino groups, which are tertiary and optionally primary, secondary or quaternary amino groups, are preferably protonated in the case of primary, secondary or tertiary amines. The amino groups still present after the reaction with epihalohydrin (b) may be partly quaternised with a conventional quaternisation agent, so that the end product always possesses the above-mentioned quantities of groups of formula (I) and optionally groups of formula (II). Dimethyl sulphate is preferably used as the quaternisation agent.

In order to produce the N-methyl-diallylamine homo- or copolymerisate, prior to polymerisation, N-methyl-diallylamine is preferably produced by means of methylation of diallylamine with formic acid and formaldehyde. Homo- or copolymerisation is preferably effected in the presence of formic acid and a mineral acid, preferably HCl, at pH 1–3, and an initiator, for example ammonium, potassium or sodium persulphate or azobis-2(2'-amidinopropane)-dihydrochloride. The reaction of the copolymer with epichlorohydrin and the polyalkylene polyamine/epichlorohydrin precondensate in a one-step process, is preferably effected in a basic medium at pH 8–11, preferably pH 9–10, and preferably at temperatures of between −5° C. and +10° C.

Compounds T have average molecular weights $M_w$ (weight average) of 10,000 to 1,000,000, preferably 50,000 to 500,000.

The dye-fixing agents of the invention have a pH value of ca. 1.0 to 7.0, preferably 1.5 to 5.0, most preferably 2.0 to 3.5.

The compounds according to the invention are used for fixing of dyed or printed substrates, including paper, leather or textile fibres which contain hydroxy, amino or thiole groups. Preferred textile fibre substrates are cellulosic materials comprising cellulose fibres, especially cotton, wool, viscose or regenerated cellulose fibres, either on their own or in a mixture with other natural or synthetic fibres, e.g. polyester, polyamide, polyacrylonitrile, polypropylene, wool and silk.

If it is used for the fixing of a deep dyeing, e.g. corresponding to 1/1 standard depth on cotton, the quantity of the compound according to the invention is preferably 0.1–5% by weight, more preferably 0.5–3% by weight, based on the active substance in the dye-fixing agent and on the dry weight of the substrate. For lighter shades, approximately 30–50% of the above amounts may be used.

The dye-fixing agent is applied to the dyed or printed substrate by an exhaust process or by alternative methods, such as padding, spraying, dipping, etc., whereby application by the exhaust process is preferred.

Typical application conditions are, for example, introduction of the dyed substrate into the fixing bath at room temperature and at a goods to liquor ratio of 1:4 to 1:20, heating to 30–60° C. over 5–20 minutes, and maintaining at this temperature for a further 5–20 minutes. Application is carried out under alkaline conditions, preferably at pH 9–13, more preferably pH 10–12.5. The alkali is preferably added after the optimum fixation temperature has been reached. A preferred alkali is soda ash. A more preferred alkali is caustic soda. If required, fixing is carried out in the presence of an electrolyte, e.g. sodium chloride, in a quantity of 5–20 g/l.

Application of the dye-fixing agent to the substrate to be finished, may take place either, after the dyed substrate has been removed from the dye bath and has been rinsed, or after the dyed and rinsed substrate has undergone an intermediate drying step. The substrate to which a dye-fixing agent of the present invention has been applied (hereinafter referred to as the "fixed substrate") is rinsed, neutralised and dried in the usual manner.

The nature of the dyestuff used for dyeing, is not critical. The dye-fixing agents of the present invention are suitable for fixing anionic dyestuffs in the form of reactive, direct or acid dyestuffs. The dyestuff may be of a type listed in the Colour Index as C.I. Reactive Dyes, C.I Acid Dyes or in particular C.I. Direct Dyes. The substrate is preferably dyed with brilliant and in particular metal-free dyes and then fixed with an agent of the invention. Examples of such dyes are Direct Yellow 152, Direct Yellow 162, Direct Orange 39, Direct Red 89, Direct Red 224, Direct Red 227, Direct Blue 71, Direct Blue 85, Direct Blue 199, Acid Blue 193 and Acid Black 194, the dyestuff from CA No. 157627-99-1 and example 2 of EP 0 425 907 A2. For mixed fabrics, dyes for other fibres may also be used. For example, for mixed fabrics of polyester and cellulose, apart from the above-mentioned reactive, acid or direct dyes, disperse dyes may also be employed.

The invention further provides a fixed substrate which is a textile substrate which has been either dyed or printed, or both and subsequently treated with a dye fixing-agent according to the invention. The substrate may have been dyed or printed using any of the above mentioned dyes or conventional printing inks. In a preferred embodiment, the fixed substrate has been dyed with either a direct or acid dyestuff. Preferred substrates are cellulosic materials.

The following examples, in which all parts and percentages are given by weight, and all temperatures are given in degrees celsius, serve to further illustrate the invention. Unless otherwise stated, the hydrochloric acid used is 30%, the sodium hydroxide solution is ca. 30% and the sodium persulphate solution is 38.4%. Epichlorohydrin is added drop-wise over the course of 15 minutes at 0–5°, unless otherwise stated.

EXAMPLE 1

129.5 parts of demineralised water, 124.4 parts of paraformaldehyde and 340.6 parts of formic acid are prepared and heated to 80°±2 under a nitrogen atmosphere. Thereafter, over the course of 6 hours with good stirring at a temperature of 80°±2°, 402.2 parts of diallylamine are added thereto, without the nitrogen atmosphere, whereby continuously ca. 181 parts of $CO_2$ are given off. The two-phase reaction mixture is cooled to room temperature and adjusted to pH 6.5 by the addition of ca. 180 parts of hydrochloric acid, during which time the temperature is held at 20–30° C. by cooling in an ice bath. Thereafter, 97.2 parts of diallylamine and 99 parts of demineralised water are added to the reaction mixture with good stirring. The reaction mixture is heated to 75°, adjusted to pH 2.5±0.3 with ca. 340 parts hydrochloric acid, and 165 parts of sodium persulphate solution are added drop-wise over the course of 4 hours at a temperature of 75–80°. The reaction mixture is stirred for 2 hours at 80° and subsequently cooled to room temperature. 1680 parts of a clear brown polymerisate P-1 are obtained.

412 parts of diethylenetriamine are placed under a nitrogen atmosphere and heated to 80–85°. 103.6 parts of epichlorohydrin are added thereto with good stirring at this temperature over the course of 90 minutes. The reaction mixture is stirred for 10 hours at 90° and left to cool to room temperature. 514 g of clear yellow precondensate V-1 with a viscosity of ca. 2000 mPa•s (20°) are obtained.

81.65 parts of polymerisate P-1, 7.64 parts of precondensate V-1 and 119.2 parts of demineralised water are prepared. 21.76 parts of sodium hydroxide solution are added drop-wise at 30° C. at a rate of 3 ml/min. and the reaction mixture is cooled to 0°. 17.28 parts of epichlorohydrin are added. The reaction mixture is stirred for 9 hours whilst maintaining this temperature and then adjusted to pH 2.5 by the addition of ca. 27 parts of hydrochloric acid. 273 parts of a clear yellow product are obtained.

EXAMPLE 2

If, in the 3rd step of example 1, 12.73 parts of precondensate V-1 and 21.48 parts of epichlorohydrin are used instead of the quantities mentioned therein, and after stirring for 8 hours at 0–3°, the reaction mixture is adjusted to pH 2.5 with ca. 41.2 parts of hydrochloric acid, 287 parts of a clear yellow product are obtained.

EXAMPLE 3

458.5 parts of dipropylene triamine are placed under a nitrogen atmosphere and heated to 80–85°. Thereafter whilst maintaining this temperature, 90.65 parts of epichlorohydrin are added thereto over the course of 1½ hours, with good stirring. The mixture is then stirred for 10 hours at 90° and left to cool to room temperature. 546.7 parts of precondensate V-2 are obtained.

81.65 parts of polymerisate P-1, 9.28 parts of precondensate V-2 and 119.2 parts of demineralised water are prepared. 21.76 parts sodium hydroxide solution are added drop-wise at 30° and the reaction mixture cooled to 0°. 14.23 parts epichlorohydnn are added thereto. The reaction mixture is stirred for 5 hours at 0–3° and then adjusted to pH 2.5 by adding ca. 30.4 parts hydrochloric acid. 275 parts of a clear yellow product are obtained.

EXAMPLE 4

If, in the 2nd step of example 3, 12.73 parts of precondensate V-2 and 18.27 parts epichlorohydrin are used instead of the quantities mentioned therein, and after stirring for 1½ hours at 0–3°, the reaction mixture is adjusted to pH 2.5 with ca. 35 parts of hydrochloric acid (30%), 288 parts of a clear yellow product are obtained.

EXAMPLE 5

438.7 parts of triethylene tetramine are placed under a nitrogen atmosphere and heated to 80–85°. 77.7 parts epichlorohydrin are added thereto with good stirring at this temperature over the course of 1½ hours. The mixture is then stirred for 10 hours at 90° and left to cool to room temperature. 513.9 parts of precondensate V-3 are obtained.

81.65 parts of polymerisate P-1, 10.18 parts of precondensate V-3 and 119.2 parts of demineralised water are made up. 21.76 parts sodium hydroxide solution are added drop-wise at 30° and the reaction mixture cooled to 0°. 14.23 parts epichlorohydrin are added thereto. The reaction mixture is stirred for 9 hours at 0–5° and then adjusted to pH 2.5 by adding ca. 34 parts hydrochloric acid. 281 parts of a clear yellow product are obtained.

EXAMPLE 6

If, in the 2nd step of example 5, 12.73 parts of precondensate V-3 and 17.0 parts of epichlorohydrin are used instead of the quantities mentioned therein, and after stirring for 9 hours at 0–3°, the reaction mixture is adjusted to pH 2.5 with ca. 38 parts of hydrochloric acid, then 287 parts of a clear yellow product are obtained.

EXAMPLE 7

711.9 parts of tetraethylene pentamine are placed under a nitrogen atmosphere and heated to 80–85°. Whilst maintaining this temperature, 97.4 parts of epichlorohydrin are added thereto with good stirring over the course of 1½ hours. The mixture is then stirred for 10 hours at 90° and left to cool to 40°. 806.6 parts of a clear, yellowish precondensate V-4 are obtained.

81.65 parts of polymerisate P-1, 12.73 parts of precondensate V-4 and 119.2 parts demineralised water are made up. 21.76 parts of sodium hydroxide solution are added drop-wise at 30° C. and the reaction mixture cooled to 0° C. 22.50 parts of epichlorohydrin are added thereto. The reaction mixture is stirred for 9 hours at this temperature and then adjusted to pH 2.5 by adding ca. 34 parts hydrochloric acid. 289 parts of clear yellow product are obtained.

EXAMPLE 8

409.5 parts of N-propylamino-ethylenediamine are placed under a nitrogen atmosphere and heated to 80–85°. At this temperatures, 90.7 parts of epichlorohydrin are added thereto with good stirring over the course of 1½ hours . The mixture is then stirred for 10 hours at 90° and left to cool to room temperature. 478.4 parts of a clear, yellowish precondensate V-5, are obtained.

81.65 parts of polymerisate P-1, 12.73 parts of precondensate V-5 and 119.2 parts of demineralised water are made up. 21.76 parts sodium hydroxide solution are added drop-wise at 30° C. and the reaction mixture cooled to 0°. 20.39 parts epichlorohydrin are added thereto. The reaction mixture is stirred for 6 hours at this temperature and then adjusted to pH 2.5 by adding ca. 37 parts hydrochloric acid. 284 parts of a clear yellow product are obtained.

EXAMPLE 9

456.1 parts of polyethylene imine (Mw 15,000) are placed under a nitrogen atmosphere and heated to 80–85°. Whilst maintaining this temperature, 5.5 parts epichlorohydrin are added thereto with good stirring over the course of 1½ hours. The mixture is then stirred for 10 hours at 90° C. and left to cool to room temperature. 455.5 parts of a clear, light-yellow precondensate V-6, are obtained.

81.65 parts of polymerisate P-1, 34.05 parts of precondensate V-6 and 119.2 parts demineralised water are made up. 21.76 parts of sodium hydroxide solution are added drop-wise at 30° and the reaction mixture cooled to 0°. 21.12 parts epichlorohydrin are added drop-wise at 0–3° over the course of 15 minutes. The reaction mixture is stirred for 2 hours at this temperature and then adjusted to pH 2.5, by adding ca. 77 parts hydrochloric acid. 349 parts of a clear yellow product are obtained.

EXAMPLE 10

250 parts demineralised water, 240 parts paraformaldehyde and 657 parts formic acid are made up and heated to 80°±2° under a nitrogen atmosphere. Then, over the course of 8 hours at 80°±2° C., 776 parts diallylamine are added thereto with good stirring, but without the nitrogen, whereby continuously ca. 343 parts of $CO_2$ are given off. The two-phase reaction mixture is cooled to room temperature and adjusted to pH 6.5 with ca. 365 parts hydrochloric acid, whereby the temperature is held at 20–30° by cooling in an ice bath. 1945 parts of a clear yellow solution P-2, are obtained.

64.7 parts diallylamine are added to 243 parts the solution P-2 with good stirring. The reaction mixture is adjusted to pH 2.5±0.3 with ca. 153 parts hydrochloric acid. Then, at a temperature of 75–80°, 40 parts sodium persulphate solution are added drop-wise over the course of 2 hours under a nitrogen atmosphere. The reaction mixture is stirred for 3 hours at this temperature and cooled to room temperature. 513 parts of a clear orange polymerisate P-3, are obtained.

77 parts polymerisate P-3, 12.7 parts precondensate V-4 of example 7 and 119.2 parts demineralised water are made up. 21.76 parts sodium hydroxide solution are added drop-wise at 30° at a rate of 3 ml/min. and the reaction mixture is cooled to 0°. 22.5 parts epichlorohydrin are added thereto. The reaction mixture is stirred for 5 hours at this temperature and then adjusted to pH 2.5 by adding ca. 39 parts hydrochloric acid. 292 parts of a clear yellow product are obtained.

EXAMPLE 11

145.5 parts diallylamine are added to 243 parts the solution P-2 (of example 10 ) with good stirring. The reaction mixture is adjusted to pH 2.5±0.3 with ca. 222 parts hydrochloric acid. Then, at a temperature of 75–80°, 40 parts sodium persulphate solution are added drop-wise over the course of 2 hours under a nitrogen atmosphere. The reaction mixture is stirred for 3 hours at this temperature and subsequently cooled to room temperature. 645 parts of a clear orange-brown polymerisate P-4, are obtained.

64.5 parts polymerisate P-4, 12.7 parts precondensate V-4 (of example 7) and 119.2 parts demineralised water are made up. 21.76 parts sodium hydroxide solution are added drop-wise at 30° C. at a rate of 3 ml/min. and the reaction mixture is cooled to 0°. 22.5 parts epichlorohydrin are added thereto. The reaction mixture is stirred for 2 hours at this temperature and then adjusted to pH 2.5 by adding ca. 39 parts hydrochloric acid. 270 parts of a clear yellow product are obtained.

EXAMPLE 12

155.2 parts diallylamine are added to 97 parts of the solution P-2 (of example 10 ) with good stirring. The reaction mixture is adjusted to pH 2.5±0.3 with ca. 195 parts hydrochloric acid. Then, at a temperature of 75–80°, 65 parts sodium persulphate solution are added drop-wise over the course of 3 hours under a nitrogen atmosphere. The reaction mixture is stirred for 3 hours at this temperature and subsequently cooled to room temperature. 521 parts of a clear orange-brown polymerisate P-5, are obtained.

65.2 parts polymerisate P-5, 13.2 parts precondensate V-4 according to example 7 and 119.2 parts demineralised water are made up. The reaction mixture is adjusted to pH 10 by adding 11.7 parts sodium hydroxide solution (ca. 30%) and is then cooled to 0°. 22.5 parts epichlorohydrin are added drop-wise over the course of 15 minutes at 0–5° C. The reaction mixture is stirred for 6 hours at this temperature and then adjusted to pH 2.5 by adding ca. 32 parts hydrochloric acid. 265 parts clear yellow product are obtained.

EXAMPLE 13

292 parts hydrochloric acid are added drop-wise to 48 parts ice and 233 parts diallylamine. The solution is heated to 80–85°. Whilst maintaining this temperature, 78 parts sodium persulphate solution are added drop-wise over the course of 6 hours. After stirring for one hour, the mixture is cooled to room temperature. 642 parts of a clear brown polymerisate P-6, are obtained.

66.8 parts polymerisate P-6, 12.7 parts precondensate V-4 (of example 7 ) and 119.2 parts demineralised water are made up. The reaction mixture is adjusted to pH 10 by adding 5.1 parts sodium hydroxide solution and is then cooled to 0°. 22.5 parts epichlorohydrin are added thereto. The reaction mixture is stirred for 7 hours at this temperature and then adjusted to pH 2.5 by adding ca. 27 parts hydrochloric acid. 253 parts of a clear yellow product are obtained.

EXAMPLE 14

389 parts the solution P-2 (of example 10 ) are diluted with 38 parts water, and adjusted to pH 2.5±0.3 with 90 parts hydrochloric acid. Then, at a temperature of 75–80°, 64 parts sodium persulphate solution are added drop-wise over the course of 3 hours. The reaction mixture is stirred for 2 hours at this temperature and cooled to room temperature. 575 parts of a clear brown polymerisate P-7, are obtained.

81.7 parts polymerisate P-7, 12.7 parts precondensate V-4 (of example 7 ) and 119.2 parts demineralised water are made up. 21.8 parts sodium hydroxide solution are added drop-wise at 30° C., and the reaction mixture is cooled to 0° C. 22.5 parts epichlorohydrin are added thereto. The reaction mixture is stirred for 9 hours at this temperature and then adjusted to pH 2.5 by adding ca. 30 parts hydrochloric acid. 286 parts of a clear orange-yellow product are obtained.

EXAMPLE 15

66.8 parts polymerisate P-6 according to example 13 and 64 parts demineralised water are made up. After adding 21 parts sodium hydroxide solution, the reaction mixture is cooled to 5–10°. 10.4 parts epichlorohydrin are added drop-wise over the course of 15 minutes at this temperature. The reaction mixture is stirred for 3 hours at this temperature and then adjusted to pH 6.5 by adding ca. 10 parts hydrochloric acid. After adding 25 parts water, 31.5 parts dimethyl sulphate are added drop-wise with good stirring over the course of 1 hour at 45–50°, whereby the pH is kept constant by adding ca. 29 parts sodium hydroxide solution (30%). After stirring for one hour, the mixture is cooled to room temperature. 257 parts a clear, dark yellow product are obtained.

EXAMPLE 16

97 parts diallylamine are neutralised with a solution of 51 parts sulphuric acid (96%) in 85 parts water. After adding 8.2 g of phosphorous acid, a solution of 5.2 parts 2,2'-azobis(2-amidinopropane)dihydrochloride in 30 parts water is added drop-wise over the course of 5 hours at a temperature of 65–70°. Stirring is subsequently effected for 10 hours at 65–70° and for 1 hour at 90°. After cooling to room temperature and adding 250 parts water, 525 parts of a yellow clear polymerisate P-8, are obtained.

131 parts this polymerisate solution P-8 are mixed with 21 parts sodium hydroxide solution (30%) and cooled to 5–10°. 10.4 parts epichlorohydrin are added drop-wise over the course of 15 minutes, then stirring is effected for 3 hours, the pH is adjusted to 6.5 with ca. 5 parts sulphuric acid, and the mixture diluted with 25 parts water. At 45–50°, 15.8 parts dimethyl sulphate are added drop-wise during one hour, whereby the pH is kept constant by adding ca. 14 parts sodium hydroxide solution (30%). After stirring for one hour, the mixture is cooled to room temperature. 220 parts a dark yellow product are obtained.

EXAMPLE 17

140 parts water and 90 parts dimethylamine are placed under a inert gas atmosphere of nitrogen. 55.5 parts epichlorohydrin are added over the course of 10 hours at 40–45°. After stirring for two hours at 85°, the mixture is cooled to room temperature. 285 parts of a clear yellow solution V-7, are obtained.

71.2 parts the solution V-7 and 189 parts tetraethylene pentamine are made up. 50.9 parts epichlorohydrin are added drop-wise over the course of 30 minutes at 85°, stirred for 10 hours at 90–95° and cooled to room temperature. 307 parts of a clear viscous solution V-8, are obtained.

13.3 parts this solution V-8, 81.65 parts polymerisate P-1 (of example 1) are mixed with 119.2 parts water and, after adding 21.76 parts sodium hydroxide solution (ca. 30%), cooled to 0°. 22.5 parts epichlorohydrin are added thereto, stirred for 5 hours and adjusted to pH 5 with ca. 17 parts hydrochloric acid. 275 parts of a yellow product are obtained.

EXAMPLE 18

71.2 parts the solution V-7 according to example 17 and 94.5 parts tetraethylene pentamine are made up. 37 parts epichlorohydrin are added drop-wise over the course of 30 minutes at 80–85°, then stirred for 10 hours at 90–95° and cooled to room temperature. 200 parts of a clear viscous solution V-9, are obtained.

14.8 parts of this solution V-8 and 81.65 parts polymerisate P-1 (of example 1) are mixed with 119.2 parts water and, after adding 21.76 parts sodium hydroxide solution, cooled to 0°. 22.5 parts epichlorohydrin are added thereto, stirred for 5 hours and adjusted to pH 5 with ca. 14 parts hydrochloric acid. 270 parts of a yellow product are obtained.

EXAMPLE 19

114 parts the solution V-7 (of example 17) and 75.6 parts tetraethylene pentamine are made up. 59.2 parts epichlorohydrin are added drop-wise over the course of 30 minutes at 80–85°, then stirred for 10 hours at 90–95° and cooled to room temperature. 245 parts of a clear viscous orange-brown solution V-10 are obtained.

16.5 parts this solution V-10, 81.65 parts polymerisate P-1 according to example 1 are mixed with 119.2 parts water and, after adding 21.76 parts sodium hydroxide solution, cooled to 0°. 22.5 parts epichlorohydrin are added thereto, stirred for 5 hours and adjusted to pH 5 with ca. 10 parts hydrochloric acid. 265 parts of a yellow product are obtained.

EXAMPLE 20

560 parts water and 317 parts dimethylamine are made up. Under nitrogen as the inert gas, 382 parts epichlorohydrin are added drop-wise over the course of 6 hours at 40–45°. The mixture is subsequently stirred for 3 hours at 85–90° and cooled to room temperature. 1250 parts a clear, dark-yellow solution V-11 are obtained.

88 parts this solution V-11 and 131 parts the polymerisate solution P-8 (of example 16) are made up, mixed with 21 parts sodium hydroxide solution (30%), and cooled to 5–10°. 10.4 parts epichlorohydrin are added drop-wise over the course of 15 minutes, then the mixture is stirred for 3 hours, adjusted to pH 6.5 with ca. 5 parts sulphuric acid, and diluted with 30 parts water. 31.5 parts dimethyl sulphate are added drop-wise at 45–50° in one hour, whereby the pH is kept constant by adding ca. 18 parts sodium hydroxide solution (30%). After stirring for one hour, the mixture is cooled to room temperature. 330 parts of a dark yellow product are obtained.

EXAMPLE 21

153.7 parts N-methyl diallylamine, 4.5 parts water and 57.5 parts diallylamine are made up, and adjusted to pH 1.75 with the assistance of 195.4 parts a 36.5% aqueous hydrochloric acid solution. The mixture is then heated to 65°, and whilst maintaining this temperature, 103.9 parts of a 15% aqueous solution of 2,2'-azobis-(2-amidinopropane)-dihydrochloride are added thereto with stirring, over the course of 20 hours. Ca. 515.0 parts of an intermediate product are obtained with a viscosity of ca. 5000 mPas (Brookfield Rotation viscosimeter, measured at 23°).

515.0 parts of the intermediate product, 200.0 parts polyethylene imine with a molecular weight of 1800 and 532.6 parts water are made up, and mixed with 355.1 parts hydrochloric acid (36.5%) so as to adjust the pH value to 1.0. The mixture is then heated to 50°. 740.0 parts epichlorohydrin are added drop-wise at this temperature over the course of ca. 5 minutes. After ca. 70 minutes at 50° C., the pH value is ca. 6.9. Then, 368.8 parts hydrochloric acid (36.5%) are added thereto, so as to adjust the pH value to 2.5, and the mixture is cooled to room temperature. Ca. 2710.0 parts of a polymer solution are obtained.

EXAMPLE 22

73.6 parts N-methyl diallylamine, 31.1 parts diallylamine, 104.2 parts N-methyl diallylamine-formic acid salt and 102.2 parts water are mixed with 178.6 parts hydrochloric acid, so as to adjust the pH value to 2.0 to 2.5. Then, 0.8 parts a 40% aqueous solution of nitrilo-triacetic acid trisodium salt are added and the monomer solution obtained is heated to 80°. Then, at this temperature, 26.8 parts sodium persulphate dissolved in 43.7 parts water are added thereto over the course of ca. 6 to 7 hours, and subsequently a further 8.0 parts sodium persulphate (solid) are added thereto. After stirring for ca. 2 hours at 80°, the mixture is cooled to room temperature. 569.0 parts of an intermediate product are obtained.

74.9 parts tetraethylene pentamine are heated to 65° C. At this temperature, 10.2 parts epichlorohydrin are added drop-wise over the course of 90 minutes, and the temperature is held below 90°. After the addition of epichlorohydrin, the mixture is left to react for 3 hours at 92–95°, cooled to ca. 50°, diluted with ca. 198.6 parts water, and cooled to 0° C. At this temperature, 150.1 parts epichlorohydrin are added drop-wise over the course of 2 hours. Subsequently, at 0 to 4°, first of all 597.2 parts water and then 569.0 parts intermediate product are added. Thereafter, 145.2 parts sodium hydroxide solution (30%) are added drop-wise at 0 to 3° C. and left to react for 12 hours at 0 to 2° C. 220.5 parts hydrochloric acid are subsequently added drop-wise so as to adjust the pH value to 2.5. 1965.0 parts of end product are obtained.

EXAMPLE 23

75.0 parts tetraethylene pentamine are heated to 80° C. Then, at this temperature, 10.3 parts epichlorohydrin are added drop-wise over the course of 3 hours, in such a way that the temperature does not exceed 90°. After ca. 4 hours at 90°, the mixture is cooled to 40° C. and after adding 36.5 parts water it is cooled to room temperature. 121.8 parts of a clear yellowish intermediate product are obtained.

107.5 parts a 37% aqueous formaldehyde solution and 109.0 parts a 85% aqueous formic acid solution are made up and heated to 60°. Then, at this temperature, 128.7 parts diallylamine are added drop-wise over the course of ca. 6 hours, in such a way that the temperature does not exceed 62°. After stirring for 2½ hours, the mixture is cooled to 30° and the pH value is adjusted to ca. 6.3 to 6.5 with 66.0 parts hydrochloric acid. Then, 31.1 parts diallylamine and ca. 115.0 parts 30% hydrochloric acid are added at room temperature, so that a pH value of about 2.0 to 2.5 is obtained. After adding 0.8 parts a 40% nitrilo-triacetic acid trisodium salt solution, the solution is heated to 78° C. At this temperature, the addition of 26.8 parts sodium persulphate, dissolved in 43.7 parts water, is commenced. During the addition, which lasts ca. 7 to 8 hours, the temperature is maintained between 80 and 85° C. Subsequently, 8.0 parts sodium persulphate (solid) are added, the mixture stirred for 1 hour and cooled to room temperature. After the addition of 121.8 parts intermediate product, 144.9 parts sodium hydroxide solution (30%) are measured in, and cooled to 5° C. Then, 756.9 parts ice are added, whereby the temperature drops to ca. −10° C. Then, 149.9 parts epichlorohydrin are added evenly drop-wise over the course of 2 hours, whereby the internal temperature is always held at 0° C. or slightly below this. After the epichlorohydrin addition, stirring is effected for 10 hours at 0° C.±1° C. After this stirring, a pH value of exactly 2.5±0.2 is set by adding ca. 232.9 parts hydrochloric acid. 3.9 parts a 40% sodium bisulphite solution are subsequently added. Ca. 1986.0 parts polymer solution are obtained.

EXAMPLE 24

515.0 parts of the intermediate product of example 21, as well as 194.7 parts a 30% aqueous solution of a reaction product of 1 molar equivalent of polyepichlorohydrin having a molecular weight of ca. 1200 with 1 mol of diethylene triamine, as well as 973.5 parts water, are cooled to ca. 3°±1° C. and mixed at this temperature with 180.1 parts epichlorohydrin which is added drop-wise in ca. 30 minutes. After ca. 3 hours at 3°±1° C., the temperature is raised to 15 to 20° C. and stirring is effected for a further ca. 10 hours at this temperature. Afterwards, heating is effected over the course of 15 minutes to 40° C., whereupon an increase in viscosity immediately takes place. Then, ca. 64.4 parts hydrochloric acid (36.5%) are added, whereby ca. 1927.0 parts a polymer solution having a viscosity of ca. 200 mPas (Brookfield, 22°) are obtained.

The invention will be further illustrated by the following application examples.

Application Example 1

100 parts a cotton dyeing using 0.95% by weight of a commercial formulation of C.I. Direct Yellow 152 (ca. 1/1 standard depth) is treated directly after dyeing and rinsing in a bath containing 1000 parts soft water at 40° C., as follows: 2.5% by weight of the polymer solution from example 1 is added thereto over the course of ca. 5 minutes, and left to run its course for 10 minutes at this temperature so as to disperse the polymer solution. Fixing is effected by measuring in 1.5 ml/l of sodium hydroxide solution 36° Bé (prediluted) over the course of ca. 10 minutes, and subsequently fixing for a further 10 minutes. The bath is subsequently drained and the goods neutralised in a fresh bath by adding an acid (acetic acid, formic acid, citric acid) thereto. A yellow dyeing with a very high degree of wet fastness (washing fastness, water fastness) is obtained.

Application Example 2

100 parts a viscose dyeing using 1.0% by weight of a commercial formulation of C.I. Direct Yellow 152 (ca. 1/1 standard depth) is treated directly after dyeing and rinsing in a bath containing 1000 parts soft water at 50° C., as follows: 2.5% by weight of the polymer solution from example 1 is added thereto over the course of ca. 5 minutes, and left to run its course for 10 minutes at this temperature so as to disperse the polymer solution. Fixing is effected by measuring in 1.5 ml/l of sodium hydroxide solution 36° Bé (prediluted) over the course of ca. 10 minutes, and subsequently fixing for a further 10 minutes. The bath is subsequently drained and the goods neutralised in a fresh bath by adding an acid (acetic acid, formic acid, citric acid) thereto. A yellow dyeing with a very high degree of wet fastness (washing fastness, water fastness) is obtained.

The following application examples using the dyestuff and dye-fixing agent in the amounts indicated in the table below, may also be carried out in the same way as for application example 1 for cotton and application example 2 for viscose. Yellow or red or blue dyeings with a very high degree of wet fastness (washing fastness, water fastness) are obtained.

In the table below, the standard depth for all dyestuffs except for C.I. Direct Blue 199 is 1/1. For C.I. Direct Blue 199 it is 1/3.

| C.I. Dyestuff | Amount in % by weight for cotton | Amount in % by weight for viscose | polymer soln. in % by weight | NaOH 36° Bé ml/l |
|---|---|---|---|---|
| Direct Yellow 162 | 1.35 | 1.40 | 3.0 | 2.0 |
| Direct Orange 39 | 1.40 | 1.70 | 3.5 | 2.5 |
| Direct Red 89 | 1.90 | 1.80 | 4.5 | 3.5 |
| Direct Red 227 | 2.70 | 1.95 | 5.5 | 4.5 |
| Direct Blue 71 | 1.00 | 0.90 | 2.5 | 1.5 |
| Direct Blue 85 | 1.30 | 1.20 | 3.0 | 2.0 |
| Direct Red 224 | 2.15 | 1.90 | 4.5 | 3.5 |
| Direct Blue 199 | 0.80 | 1.90 | 2.5 | 1.5 |

Application Example 3

A wool fabric dyed with 4% C.I Acid Blue 193 is directly after dyeing and rinsing, immersed in a bath containing 3% (on weight fabric) of the polymer solution of example 1 at 50° C. The fabric is treated for 10 minutes at this temperature to allow good distribution of the polymer solution. The bath is brought to pH 10 by adding the required amount of ammonia and the fabric is treated for a further 20 minutes to complete the fixation. Thereafter the bath is drained and the fabric is rinsed with fresh water and neutralized. The dyed fabric exhibits very good wet fastness.

Application Example 4

Application example 3 is repeated using instead of C.I Acid Blue 193, C.I Acid Black 194. The dyed fabric exhibits very good wet fastness.

Instead of the polymer solution from example 1, the polymer solutions from the other examples may also be used in the above application examples 3 and 4.

We claim:

1. Dye-fixing agent, obtainable by reacting, in a first reaction step, (1) selected from: a homopolymer of diallylamine; a homopolymer of N-methyl-diallylamine; or a copolymer of diallylamine and N-methyl-diallylamine; with (2) selected from: an epihalohydrin; a reaction product of epihalohydrin with an aliphatic amine; a reaction product of epihalohydrin with a polyamine;

wherein, when (2) is an epihalohydrin then the reaction either takes place in the presence of an aliphatic amine or polyamine; or is followed by partial quaternisation of the reaction product of the first reaction step, or takes place in the presence of an aliphatic amine or polyamine and is followed by partial quaternisation of the reaction product of the first reaction step;

resulting in an end product; said end product possesses at least 10 mol % of tertiary amino groups of the following formula (I), based on the total number of amino groups

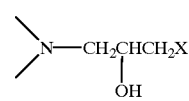

(I)

wherein X=halogen, with the provisos that when the homopolymer is an N-methyl-diallylamine, the presence of an aliphatic amine or a polyamine is obligatory in the reaction with the epihalohydrin and when the homopolymer is a homopolymer of diallylamine, partial quaternisation of the reaction product of the first reaction step is obligatory.

2. Dye-fixing agent according to claim 1, wherein (1) includes a N-methyl-diallylamine the end product additionally possesses at least 10 mol % of tertiary amino groups of formula (II)

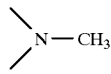
(II)

based on the polymerised diallylamino groups.

3. Dye-fixing agent according to claim 1, obtainable by means of a (partial) reaction of a homopolymer of diallylamine with an epihalohydrin, with subsequent quaternisation.

4. Dye-fixing agent according to claim 1, obtainable by reacting in a first reaction step a homopolymer of N-methyl-diallylamine or a copolymer of diallylamine and N-methyl-diallylamine with an epihalohydrin (b) in the presence of an aliphatic amine or polyamine, optionally followed by partial quaternisation of the reaction product.

5. Dye-fixing agent according to claim 1, wherein the polyamine is a precondensate of a polyalkylene polyamine having a molecular weight of 100 to 150,000, with an epihalohydrin.

6. Process for the dye-fixing of dyed or printed substrates comprising the step of treating the substrate with a dye-fixing agent as claimed in claim 1.

7. Process as claimed in claim 6, wherein the substrate comprises cellulose fibres dyed with a direct, acid or reactive dyestuff, or mixtures of cellulose fibres and other natural or synthetic fibres, the cellulose fibres being dyed with a direct, acid or reactive dye, and the natural or synthetic fibres being dyed with a suitable dyestuff.

8. A treated textile substrate comprising:

a textile substrate;

a dye; and a dye fixing-agent as claimed claim 1.

9. The treated textile substrate according to claim 8 wherein said dye is a direct or acid dyestuff.

10. Dye-fixing agent according to claim 4, obtainable by reacting the homopolymer or copolymer with the precondensate product (a) obtainable by reacting an epihalohydrin with a polyalkylene polyamine, optionally followed by partial quaternisation of the reaction product.

11. Dye-fixing agent according to claim 5, wherein said polyalkylene polyamine is selected from the group of: pentaethylene hexamine, tetraethylene pentamine, triethylene tetramine, diethylene triamine, dipropylene triamine, N-propylaminoethylene diamine, or polyethylene imine.

12. Process for the dye-fixing of dyed or printed substrates as claimed in claim 6, wherein said substrates include leather or textile fibres containing hydroxy, amino or thiole groups.

\* \* \* \* \*